April 23, 1963

G. J. SCOLES 3,087,079

ELECTRICAL PULSE GENERATORS

Filed June 25, 1958

INVENTOR
GRAHAM JOHN SCOLES

BY *Lansan and Taylor*

ATTORNEYS

United States Patent Office 3,087,079
Patented Apr. 23, 1963

3,087,079
ELECTRICAL PULSE GENERATORS
Graham John Scoles, Bowdon, England, assignor to Associated Electrical Industries (Manchester) Limited
Filed June 25, 1958, Ser. No. 744,609
Claims priority, application Great Britain June 25, 1957
4 Claims. (Cl. 310—111)

This invention relates to electric pulse generators.

Electrical pulses of several decades of megawatts can readily be generated by means of line type modulators using devices such as hydrogen thyratrons as the switching means. The limiting factor is the availability of suitable switching means for the generation of pulses of higher power.

It is an object of the present invention to provide an electric pulse generator capable of generating pulses of greater power than those used hitherto.

According to the present invention an electrical pulse generator comprises a stator member and a rotor member, one of which has a field winding and the other of which has an armature winding, means for applying pulses to said field winding to produce a pulsed magnetic field and means for deriving an output from the E.M.F. induced in said armature winding.

The term "armature winding" as used herein denotes that winding whether rotating or stationary in which the E.M.F. output of the generator is induced. Preferably, however, the armature winding is provided on the rotor member while the field winding is provided on the stator member.

It will be realised that the output energy is obtained from the energy stored in the rotating mass of the rotor and not from the input to the field winding, which merely determines the waveform of the output. It is desirable to construct the field carrying member so that it has as little inductance as possible and the stator may consist of a number of iron circuits of the C-core type arranged side by side and threaded by a small number of conductors.

The pulse applying means may be a condenser or pulse forming network which is discharged through the field winding. In a preferred arrangement the pulse applying means is arranged to produce half-sine wave pulses while the field is such that it saturates to produce an approximately square magnetic field waveform therefrom. Alternatively, the pulse current may itself be square in waveform.

As the pulses will in general be of short duration the rotor will only move a short distance during the generation of a pulse. Hence there is no need for any commutator but only for slip rings to extract the power from the rotor. Alternatively spark gaps can be used for this purpose.

Figure 1:
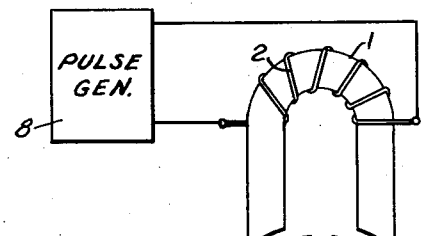
Figure 2:
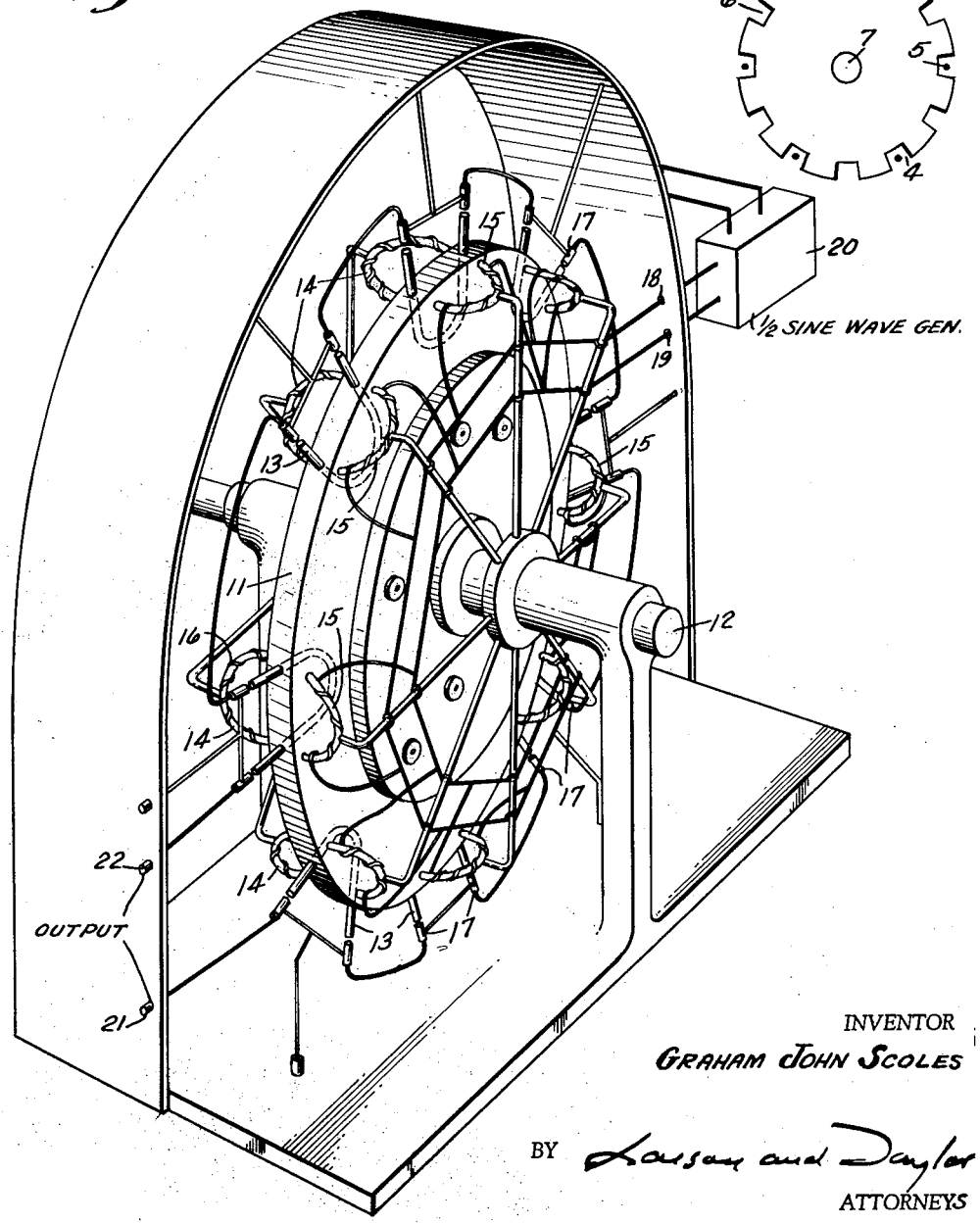

In order that the invention may be more fully understood reference will now be made to the drawings accompanying this specification, in which:

FIG. 1 shows one embodiment of the invention;
FIG. 2 shows an alternative embodiment.

In FIG. 1 a stationary field magnet 1 is provided and comprises a number of stacked C-type cores. The cores are threaded by a field winding 2. The stator is constructed so as to have as little inductance as possible. A rotor 3 mounted on shaft 7 rotates in the field produced by the stator winding and has a plurality of slots 4 located round its periphery which carry armature conductors 5. Additionally slots, such as 6, are also provided for the purpose of diverting the flux.

In operation a pulse waveform from pulse generator 8 is applied to field winding 2 and an induced E.M.F. of related waveform will be generated in armature winding 5.

A plurality of field systems may be provided and can be arranged to be separate or connected in parallel or in series. Similarly separate rotor windings can be provided which can be connected in parallel or in series or maintained electrically separate to produce pulses of any desired magnitude.

An alternative arrangement is shown in FIG. 2. In this figure a disc shaped rotor 11 is mounted for rotation on a shaft 12. A plurality of radially extending conductors 13 are provided on rotor 11 and a pair of such conductors are connected together at their inner ends to form U-shaped windings. The generator field is provided by a plurality of pairs of C-shaped magnetic cores 14 and 15 which are provided with field windings 16 connected in parallel across field input terminals 18 and 19 supplied from a half sine wave generator 20. The span of cores 14 and 15 are arranged to be equal to the pitch of the U-shaped windings and it will be appreciated that if a current pulse is applied to field windings 16 a voltage will be generated across the ends of rotor windings 13. The rotor windings can be suitably connected in series around the rotor through spark gaps 17 connected in series from which the voltage can be fed to an external circuit through terminals 21 and 22.

What I claim is:

1. An electrical pulse generator comprising a stator member comprising a plurality of C-shaped iron members, a field winding on said stator member comprising a plurality of electrical conductors threading said iron members, a rotor member, an armature winding on said rotor member comprising a plurality of U-shaped conductors with the limbs of the U-shaped conductors extending radially of the axis of the rotor member and the pitch of the U-shaped conductors being substantially equal to the span of said C-shaped iron members, means for applying pulses to said field winding to produce a pulsed magnetic field and means for deriving an output from the E.M.F. induced in said armature winding.

2. An electrical pulse generator comprising a stator member comprising a plurality of C-shaped iron members, a field winding on said stator member comprising a plurality of electrical conductors threading said iron members, a rotor member, an armature winding on said rotor member comprising a plurality of U-shaped conductors with the limbs of the U-shaped conductors extending radially of the axis of the rotor member and the pitch of the U-shaped conductors being substantially equal to the span of said C-shaped iron members, means for applying half-sine wave pulses to said field winding, said iron members being arranged to saturate when said half-sine wave pulses are applied to said field winding so as to produce a magnetic field of substantially square waveform, and means for deriving an output from the square wave E.M.F. induced in said armature winding.

3. An electrical pulse generator comprising a stator member and a generally disc-shaped rotor member, said stator member comprising a plurality of pairs of C-shaped iron members, the members of a pair being positioned facing each other with the rotor member lying between them, a field winding on said stator member comprising electrical conductors threading said iron members, an armature winding on said rotor member comprising a plurality of U-shaped conductors with the limbs of the U-shaped conductors extending radially of the axis of the rotor member and the pitch of the U-shaped conductors being substantially equal to the span of said C-shaped iron members, means for applying pulses to said field winding to produce a pulsed magnetic field at instants when the angular position of the armature is such that said U-shaped conductors are aligned with said C-shaped iron members, and means for deriving an output from the E.M.F. induced in said armature winding.

4. An electrical pulse generator comprising a stator member and a generally disc-shaped rotor member, said stator member comprising a plurality of pairs of C-shaped iron members, the members of a pair being positioned facing each other with the rotor member lying between them, a field winding on said stator member comprising electrical conductors threading said iron members, an armature winding on said rotor member comprising a plurality of U-shaped conductors with the limbs of the U-shaped conductors extending radially of the axis of the rotor member and the pitch of the U-shaped conductors being substantially equal to the span of said C-shaped iron members, means for applying pulses to said field winding to produce a pulsed magnetic field at instants when the angular position of the armature is such said U-shaped conductors are aligned with said C-shaped iron members, and spark gaps between the ends of the U-shaped conductors and the stator member, which spark gaps are connected in series to derive an output corresponding to the sum of the E.M.F's induced in each conductor.

References Cited in the file of this patent

UNITED STATES PATENTS

| 1,807,218 | Langewiesche | May 26, 1931 |
| 1,964,265 | Markley | June 26, 1934 |
| 2,475,837 | Hulbert | July 12, 1949 |